United States Patent
Zheng et al.

(10) Patent No.: US 7,770,895 B2
(45) Date of Patent: Aug. 10, 2010

(54) SEGMENTED SEAL PORTION AND ASSEMBLY

(75) Inventors: Xiaoqing Zheng, East Greenwich, RI (US); Edward N. Ruggeri, Westport, MA (US); Charles J. Alten, Cave Creek, AZ (US); Robert J. Sustarsic, Warwick, RI (US)

(73) Assignee: Eaton Corporation, Cleveland, OH (US)

( * ) Notice: Subject to any disclaimer, the term of this patent is extended or adjusted under 35 U.S.C. 154(b) by 412 days.

(21) Appl. No.: 11/743,005

(22) Filed: May 1, 2007

(65) Prior Publication Data
US 2008/0272552 A1 Nov. 6, 2008

(51) Int. Cl.
*F16J 15/447* (2006.01)

(52) U.S. Cl. ...................................................... 277/416

(58) Field of Classification Search ................ 277/416, 277/422
See application file for complete search history.

(56) References Cited

U.S. PATENT DOCUMENTS

| | | | | |
|---|---|---|---|---|
| 3,124,502 A | * | 3/1964 | Radke | 428/66.4 |
| 3,575,424 A | * | 4/1971 | Taschenberg | 277/411 |
| 3,743,303 A | * | 7/1973 | Pope | 277/422 |
| 4,082,296 A | * | 4/1978 | Stein | 277/400 |
| 4,145,058 A | * | 3/1979 | Hady et al. | 277/366 |
| 4,199,152 A | * | 4/1980 | Catterfeld | 277/422 |
| 4,685,684 A | * | 8/1987 | Ballard | 277/416 |
| 5,058,904 A | | 10/1991 | Nevola | |
| 5,169,159 A | | 12/1992 | Pope | |
| 5,370,402 A | | 12/1994 | Gardner et al. | |
| 5,632,493 A | | 5/1997 | Gardner | |
| 6,145,843 A | | 11/2000 | Hwang | |
| 6,328,528 B1 | * | 12/2001 | Dahlheimer | 415/113 |
| 6,338,490 B1 | | 1/2002 | Bainachi | |
| 6,692,006 B2 | * | 2/2004 | Holder | 277/346 |
| 7,540,501 B2 | * | 6/2009 | Flaherty | 277/399 |

FOREIGN PATENT DOCUMENTS

| EP | 0523899 A1 | 1/1993 |
|---|---|---|
| EP | 1302709 A2 | 4/2003 |

OTHER PUBLICATIONS

European Patent Office, European Search Report for Application No. EP 08008172, dated Sep. 9, 2008.
Hung Tran and Peter Haselbacher, High-performance lift augmentation dynamic seals for turbine bearing compartments, Sealing Technology, Jan. 2004, pp. 5-10, vol. 2004, Issue 1, Elsevier Ltd., The Netherlands.

* cited by examiner

*Primary Examiner*—Thomas B Will
*Assistant Examiner*—Gilbert Y Lee
(74) *Attorney, Agent, or Firm*—Dykema Gossett PLLC

(57) ABSTRACT

A segment of a seal assembly for sealing a higher pressure area from a lower pressure area is disclosed. The segment comprises a radial external surface, a radial internal surface for sealing against a rotating member, a transverse groove for maintaining a pressure around portions of the segment, and one or more pads including a scooping groove. The scooping groove is positioned at or in proximity to an edge of the transverse groove and provides for a transition flow between the one or more pads and the transverse groove.

24 Claims, 3 Drawing Sheets

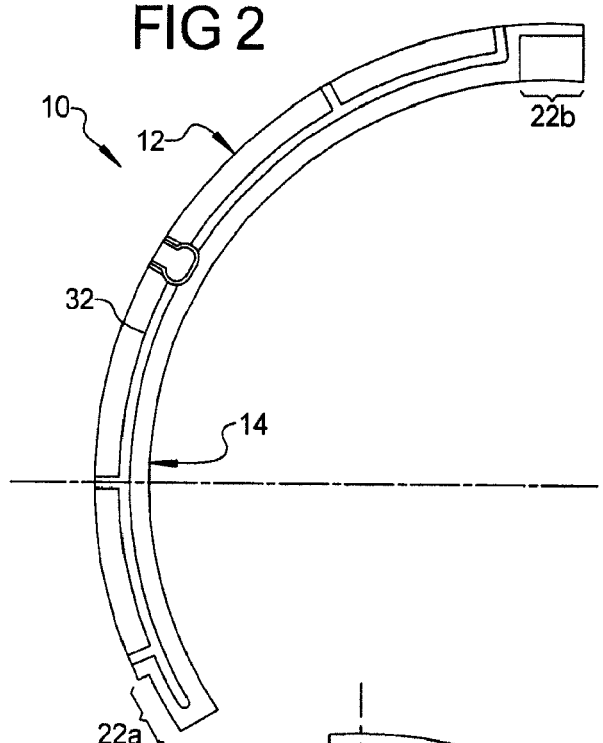
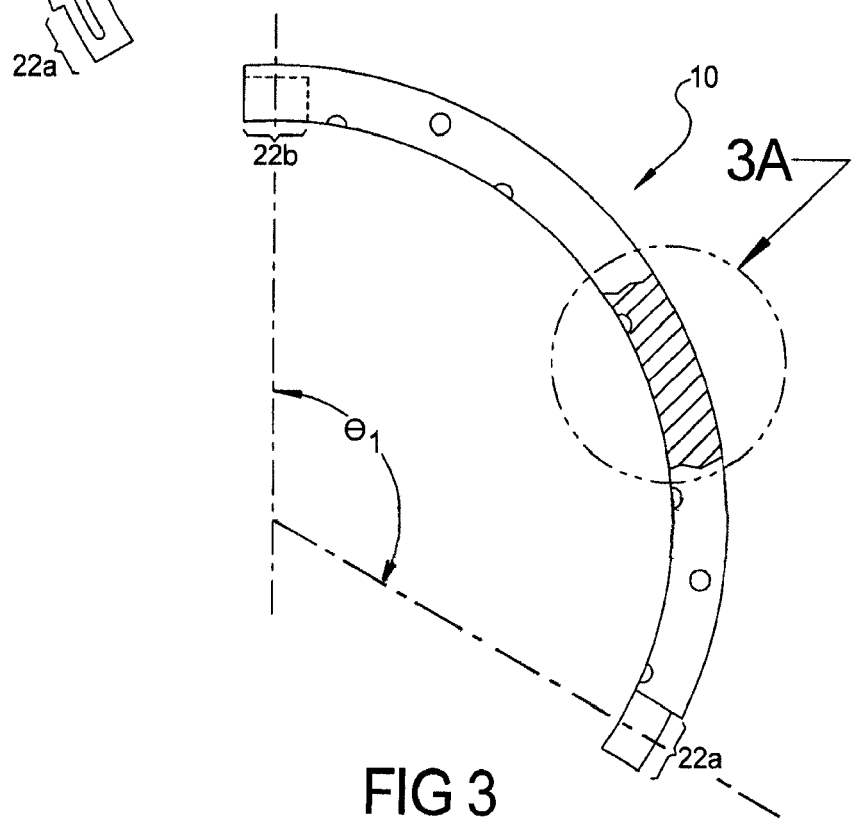

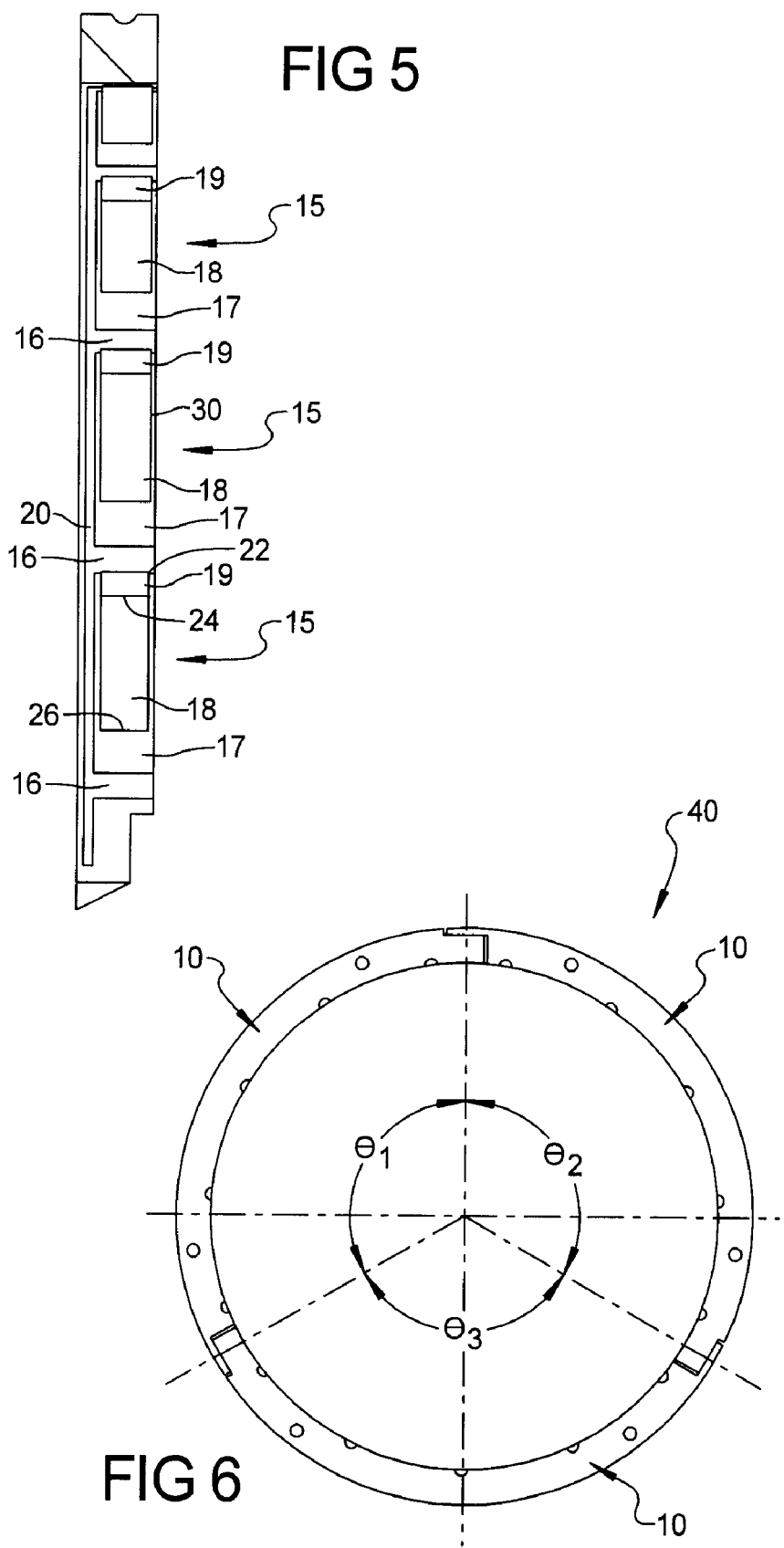

SEGMENTED SEAL PORTION AND ASSEMBLY

TECHNICAL FIELD

The present invention relates to segmented radial seal assemblies.

BACKGROUND

Segmented carbon radial or circumferential seals have been employed in a number of environments associated with compressible fluids, such as gases. They have been used, for example, in connection with gas turbine engines. Such radial seals typically act to, among other things, seal high pressure areas from low pressure areas. For some applications, Rayleigh steps or pads have been included to generate hydrodynamic opening force that enables a segmented seal to operate in a "non-contact" condition. The hydrodynamic opening force generated by a plurality of pads can distribute the associated force more evenly along a circumferential direction providing, among other things, a better balancing of forces. However, it has been found that an abrupt flow transition can occur with respect to the entrance of Rayleigh steps or pads and the transverse groove that helps to provide appropriate pressure balance. An abrupt transition between the transverse groove and the steps or pads can, among other things, cause associated flow losses and reduced efficiency.

SUMMARY

A segment of a seal assembly for sealing a higher pressure area from a lower pressure area is disclosed. The segment comprises a radial external surface, a radial internal surface for sealing against a rotating member, a transverse groove for maintaining a pressure around portions of the segment, and one or more pads including a scooping groove. The scooping groove is positioned at or in proximity to an edge of the transverse groove and provides for a transition flow between the one or more pads and the transverse groove.

BRIEF DESCRIPTION OF THE DRAWINGS

Embodiments of the invention will now be described, by way of example, with reference to the accompanying drawings, wherein:

FIG. 2 is a view of a low pressure side of seal ring segment according to an embodiment of the invention;

FIG. 5 is a view of the bore region of a seal ring segment viewed looking from an inner diameter (ID) to an outer diameter (OD); and FIG. 6 is a top plan view of an assembly of seal ring segments according to an embodiment of the invention.

DETAILED DESCRIPTION

Reference will now be made in detail to embodiments of the present invention, examples of which are described herein and illustrated in the accompanying drawings. While the invention will be described in conjunction with embodiments, it will be understood that they are not intended to limit the invention to these embodiments. On the contrary, the invention is intended to cover alternatives, modifications and equivalents, which may be included within the spirit and scope of the invention as defined by the appended claims.

Figure 1:
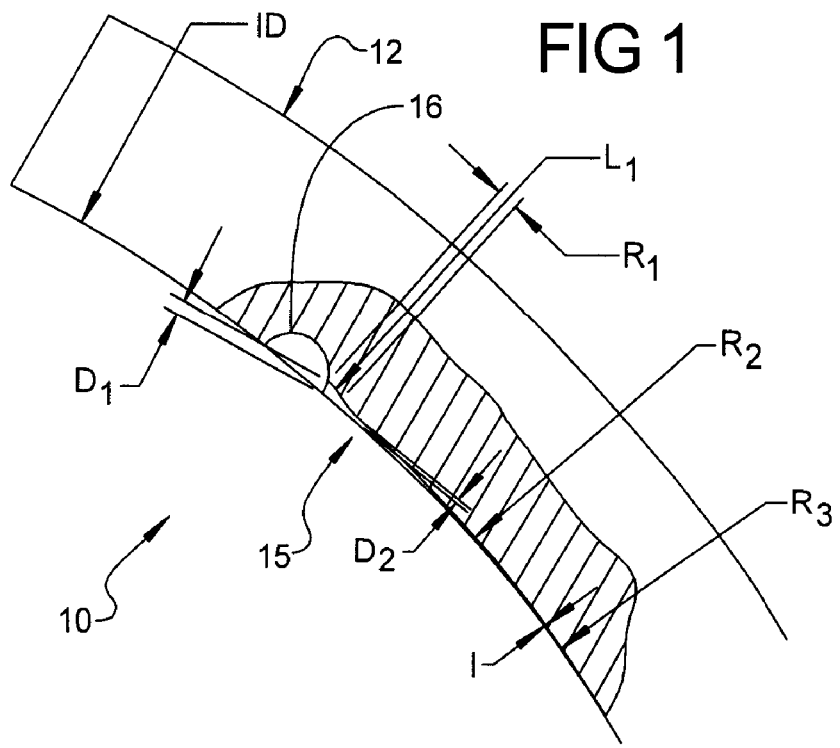
FIG. 1 is a partial cut plane view of a seal ring segment according to an embodiment of the invention.

A partial cut plane view of a seal ring segment 10 according to an embodiment of the invention is generally shown in FIG. 1. Illustrated segment 10 includes a radial external surface 12, a radial internal surface 14 corresponding to a bore side of the segment, two or more transverse grooves 16, one or more lift augmentation formations (also referred to as "pads") 15, and a peripheral flow groove or peripheral channel 20 (see, e.g., FIG. 5). In an embodiment, a portion of a plurality of sealing ring segments are combined to provide a seal against a rotating member, such as a shaft or runner.

FIGS. 2 and 3 illustrate views of a low pressure side and a high pressure side, respectively, of a ring segment according to an embodiment of the invention. FIG. 5 depicts the bore region of a seal ring segment of the type shown in FIGS. 2 and 3, including a plurality of pads 15 on the internal (or bore-side) surface 14 of segment 10. Each segment may cover a portion or angular segment of the 360° degrees, which may commonly be needed to provide a seal about a round or circular rotating member. In the embodiment illustrated in FIG. 3, $\theta_1$ is approximately 120°. When a plurality of similar segments are involved, the angular range covered by each segment will typically be a multiple of 360°, such as 72°, 90°, 120°, or 180°. Moreover, as generally indicated in FIG. 3 (i.e., the portion not included with $\theta_1$), there may be a portion of each end of the segment that is intended to overlap or interconnect with an adjacent segment. Additionally, the one or more pads 15 included on the bore-side may, for example, comprise one or more steps or pads, such as Rayleigh steps or pads.

Figure 3A:
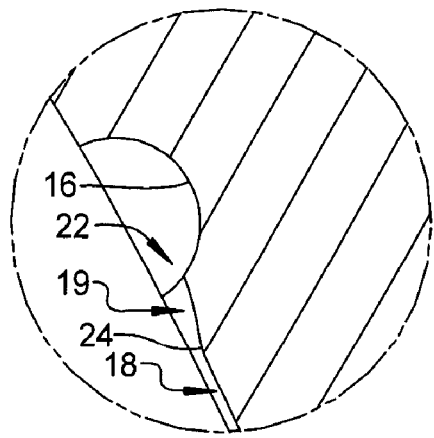
FIG. 3 is a view of a high pressure side of a seal ring segment according to an embodiment of the invention.

As generally illustrated in connection with FIG. 3A and FIG. 5, each pad 15 may, for instance, include a plateau 17, a sloped portion (also referred to as a "ramp" or "ramped portion") 18, and an enlarged volume portion (also referred to as a "scooping groove") 19. In an embodiment, the scooping groove 19 can start at or in proximity to an edge 22 of a transverse (e.g., feeding) groove 16 and can be configured to become progressively shallower in a direction moving along the surface of the pad away from the associated groove 16. At some distance from groove 16 (e.g., at or about 24), the associated scooping groove 19 is configured to transition into a sloped portion or ramp 18. The sloped portion or ramp 18 may then further continue to become progressively more shallow (again taken in a direction moving away from the associated groove 16), but at a depth that is typically noticeably shallower than the scooping groove. At some further distance moving away from the associated groove 16 (e.g., at or about 26), the ramp 18 may transition into a plateau 17. The plateau 17 is generally the shallowest portion of the pad 15, and a plateau 17 is typically adjacent or in proximity to the next successive groove 16. In an embodiment, the portions of the plateau 17 extend further radially outwardly than the remainder of the pad—i.e., the sloped portion 18 and the scooping groove 19.

For example, without limitation, ramp 18 can be configured to transition into a plateau 17 (e.g., at 26) at a distance that is more than one-half the length of the pad 15 (viewed along its associated inner circumference). In an embodiment, ramp 18 may be configured to transition into a plateau 17 (e.g., at 26) at a distance that is more than about $2/3^{RDS}$ of the distance along the pad 15 from the associated groove 16.

The pads 15, which are configured on the inner diameter, i.e., on the radial internal surface 14, permit high pressure air to migrate down channels as a shaft rotates, the air or fluid may then be channeled into grooves by the pads. The associated pressure may be used to offset assembly or system closing forces. Essentially, air under the seal can be used to generate a pressure that may be used to at least partially offset contact pressure.

In some conventional assemblies, air that moves axially down a shaft is forced to make an abrupt 90° turn as it is forced under the segment. Such an abrupt turn can cause a loss of momentum in flow and, potentially, a drop-off in feed (i.e., a situation in which there is no air working). The inclusion of a scooping groove 19 (or "undercut" in the ramp 18), of the type generally illustrated, can serve as a reservoir to provide the airflow with more room to make the necessary turn, thereby improving the efficiency of the air that is pumped into ramp 18 from the transverse groove 16. Typically, one enlarged volume portion, or scooping groove 19, is provided per pad.

It is noted that many of the dimensions are dictated by the application and various manufacturers. Nevertheless, by way of further example, in an embodiment of the invention, such as that shown in FIG. 1, the segment 10 may have an inner diameter of 3.000 inches at or about the position indicated as ID. The segment may further have a depth $D_1$ of the scooping groove 20 at or about the edge of transverse groove 16 that is about 0.012 inches, and that decreases to a depth of about 0.005 inches at a point where the scooping groove 19 transitions into the ramp portion 18. The depth may then further decrease, and become shallower, through the remainder of the ramp portion. The ramp portion may then further transition into a plateau 17. By way of example, without limitation, the position indicated in connection with depth $D_2$ in FIG. 1 may be about 0.005 inches, and the segment may have a depth of about 0.001 at the intersection point identified as I. In an embodiment, the depth associated with $D_1$ may be extended, at substantially the same or a similarly notable depth greater than ramp 18, for a length $L_1$ from groove 16 of about 0.020 inches. Further, the radius at or about the positions designated $R_1$ and $R_3$ may be about 0.1250 inches, while the radius at or about the position designated $R_2$ may be about 1.580 inches. Moreover, in an embodiment, the ramp 18 is at least four times longer than its deepest radial dimension.

Among other things, an appropriately configured scooping groove 19 can help improve the ability of a pad 15 to generate and hold hydrodynamic pressure near the end of the member. The scooping groove at the entrance of the pad 15 can smooth the transition from a groove that, in conventional ring segments may have previously been very shallow near the leading edge of the member. For example, such a groove depth previously may have been around 0.001 inches, while the scooping groove 19 may have a depth that is about 0.030 inches. The present invention, among other things, serves to reduce the effects of abrupt transition from the transverse groove 16 to the sloped portion or ramp 18.

Moreover, since the associated rotating shaft is not perfectly round, and the seal tracks the shaft, the configuration of the scooping groove (acting in part as a reservoir) can help prevent momentary starvation of fluid supply, which can lead to contact and wear. Consequently, the scooping groove 19—having an increased depth (or scoop) proximate the transverse groove 16—can serve to not only reduce entrance losses, but can provide a more continuous and smooth supply of fluid for the pad 15.

Turning again to FIG. 5, in an embodiment, a peripheral flow groove 20 is included on the internal (bore-side) surface 14. The transverse groove 16 and flow groove 20 can, for instance, be machined on the bore-side surface of each pad. Flow groove 20 can be provided at or in proximity to an end of the transverse groove 16 and can provide for fluid communication between one or more associated transverse grooves 16. The flow groove 20 can, among other things, help maintain a more uniform or stable pressure around portions of segment 10. Moreover, flow groove 20 can be designed and configured to provide a desired equalization of pressure between pads 15.

In an embodiment of the invention, the ramp 18 and scooping groove 19 do not flow all the way through in an axial direction. Rather, the ramp 18 and scooping groove 19 may be bounded or guarded by sidewalls 30 on both the high-pressure and low-pressure sides, with the scooping groove introduced to serve as a reservoir to feed ramp 18. Heat generation and removal can be effectively addressed and improved by the present invention. That is, the segments and assembly can be configured to create sufficient opening force to lift the segment off the shaft and significantly reduce heat generation so that the useful life of the seal is extended.

FIG. 2 illustrates a low pressure side view of a seal ring segment 10 according to an embodiment of the invention. As generally shown, the segment 10 may further include an axial pressure balance groove 32.

In an embodiment of the invention, each segment 10 may be one of a plurality of segments that together comprise a segmented seal ring or assembly. A general representation of an assembly 40 of seal ring segments 10 is shown in FIG. 6. In an embodiment, three seal ring segments, each covering a radial portion of approximately 120° each (e.g., $\theta_1$, $\theta_2$, $\theta_3$) are interconnected or otherwise assembled to cover a full 360° associated with the radial internal surface of the assembly. However, as understood by those of skill in the field, the invention is not limited to assemblies comprised of three seal ring segments. Further, while it may be preferable for a number of applications, the invention is not limited to an assembly in which each segment covers a substantially identical radial portion provided the assembly can adequately function in its intended environment.

Figure 4:
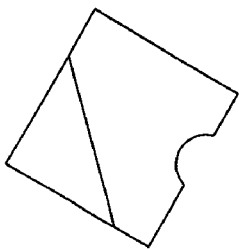
FIG. 4 is an end view of a transition portion.

As generally illustrated in FIGS. 2 and 3, each seal ring segment 10 includes at least one transition portion, and preferably first and second transition portions 22a, 22b at each end. The transition portions serve to interface with or overlap (e.g., a sliding overlap) with an adjacent segment. By way of example, without limitation, the transition portion may comprise a joint or segment with a diagonal cut (see, e.g., FIG. 4) that mirrors the cut of the opposing end. That is, in an embodiment, a first transition portion 22a from one segment 10 can be configured to overlap and interface with as second transition portion 22b from an adjacent segment 10. Therefore, as desired for many applications, and potentially for manufacturing efficiencies, each of the segments can be identical to one another.

In an embodiment, the radial external surface of each segment, i.e., the surface opposing the bore-side surface shown in FIG. 5, may include a retention groove (also referred to as a channel) for receiving a spring. The retention groove may be configured such that, when the plurality of segments are positioned to engage one another, the spring is retained within the retention groove and holds the segments in an interconnected configuration. If desired, the retention groove and spring may be of the type commonly employed by conventional segmented sealing ring assemblies.

Additionally, for some embodiments, an element, such as a carbon pin, may be used to connect the assembly to a housing so that the assembly does not rotate relative to the housing.

The foregoing descriptions of specific embodiments of the present invention have been presented for purposes of illustration and description. They are not intended to be exhaustive or to limit the invention to the precise forms disclosed, and various modifications and variations are possible in light of the above teaching. The embodiments were chosen and described in order to explain the principles of the invention and its practical application, to thereby enable others skilled in the art to utilize the invention and various embodiments with various modifications as are suited to the particular use contemplated. It is intended that the scope of the invention be defined by the claims appended hereto and their equivalents.

What is claimed is:

1. A segment of a seal assembly for sealing against a rotating member, the segment comprising:
    a radial external surface;
    a radial internal surface for sealing against said rotating member;
    a transverse groove for maintaining a pressure around portions of the segment; and
    one or more pads, each of the one or more pads including a scooping groove at or in proximity to the transverse groove, a ramped portion adjacent to the edge of the scooping groove, and a plateau adjacent to the edge of the ramped portion; wherein the scooping groove has an increasing depth moving in a direction toward the transverse groove, and the scooping groove including a transition portion between the transverse groove and the ramped portion of the pad.

2. The segment of claim 1, wherein the pad is comprised of a Rayleigh step or pad.

3. The segment of claim 1, wherein the transverse groove is semicircular.

4. The segment of claim 1, wherein the scooping groove transitions directly into the transverse groove.

5. The segment of claim 1, wherein the ramped portion transitions into the plateau.

6. The segment of claim 1, wherein the plateau is adjacent or in proximity to another transverse groove.

7. The segment of claim 1, wherein the scooping groove has a depth greater than the greatest depth of the ramped portion.

8. The segment of claim 1, wherein the segment includes a joint or connection configuration at each radial end that is configured for connection to another segment.

9. The segment of claim 8, wherein the segment includes a joint or connection configuration that is adapted for an interconnecting or interlocking with a joint or connection of an adjacent segment.

10. The segment of claim 1, wherein the segment is configured for connection with an external housing that receives the segment.

11. The segment of claim 10, wherein the segment is configured such that when connected with the external housing the segment does not rotate relative to the housing.

12. The segment of claim 1, wherein the volume associated with the scooping groove is configured to provide room for the efficient flow of an associated fluid between the transverse groove and a sloped or ramped portion of the pad.

13. The segment of claim 1, wherein the scooping groove is at least four times longer than its deepest radial dimension.

14. The segment of claim 1, wherein the scooping groove includes a side wall on both a high pressure and low-pressure side of the scooping groove.

15. The segment of claim 1, wherein the scooping groove functions as a reservoir and feeds air to the ramped portion.

16. The segment of claim 1, wherein the segment is comprised of carbon.

17. The segment of claim 1, wherein the segment is comprised of plastic.

18. The segment of claim 1, wherein the segment is comprised of ceramic.

19. The segment of claim 1, wherein the segment is comprised of metal.

20. A segment of a seal assembly for sealing against a rotating member, the segment comprising:
    a radial external surface;
    a radial internal surface for sealing against said rotating member;
    a transverse groove for maintaining a pressure around portions of the segment; and
    a plurality of pads including a plateau, a ramped portion adjacent the plateau, and a scooping groove adjacent the ramped portion and at or in proximity to the transverse groove; wherein the ramped portion transitions into the scooping groove with an increasing depth moving in a direction toward the transverse groove, the scooping groove has a depth greater than the greatest depth of the ramped portion, and the scooping groove including a transition portion between the transverse groove and the ramped portion.

21. A segmented seal assembly for sealing against a rotating member, the assembly comprising:
    a plurality of segments including a radial outer surface, a radial inner surface for sealing against said rotating member, a transverse groove for maintaining a pressure around portions of the segment, and one or more pads that create lift augmentation pressure, the one or more pads including a scooping groove at or in proximity to an edge of the transverse groove; a ramped portion adjacent to the edge of the scooping groove; and a plateau adjacent to the edge of the ramped portion; wherein the scooping groove has an increasing depth moving in a direction toward the transverse groove, and the scooping groove including a transition portion between the transverse groove and the ramped portion of the pad.

22. The assembly of claim 21, wherein the assembly is ring-shaped.

23. The assembly of claim 21, wherein the assembly is comprised of three segments.

24. The assembly of claim 23, wherein each segment of the assembly covers a radial portion or extent of approximately 120°.

* * * * *